United States Patent
Ruiz et al.

(10) Patent No.: US 12,451,157 B2
(45) Date of Patent: Oct. 21, 2025

(54) REDUCTION OF HIGH TAPE CONTACT PRESSURE POINTS AGAINST HEAD ASSEMBLY

(71) Applicant: Western Digital Technologies, Inc., San Jose, CA (US)

(72) Inventors: Oscar J. Ruiz, San Jose, CA (US); Kenji Kuroki, Fujisawa (JP); Eduardo Torres Mireles, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/734,285

(22) Filed: Jun. 5, 2024

(65) Prior Publication Data

US 2024/0321295 A1 Sep. 26, 2024

Related U.S. Application Data

(60) Division of application No. 17/991,620, filed on Nov. 21, 2022, now Pat. No. 12,033,674, which is a
(Continued)

(51) Int. Cl.
*G11B 5/265* (2006.01)
*G11B 5/255* (2006.01)
(Continued)

(52) U.S. Cl.
CPC ............ *G11B 5/2655* (2013.01); *G11B 5/255* (2013.01); *G11B 5/40* (2013.01); *G11B 15/60* (2013.01)

(58) Field of Classification Search
None
See application file for complete search history.

(56) References Cited

U.S. PATENT DOCUMENTS

| | | |
|---|---|---|
| 4,170,033 A | 10/1979 | Ridgway et al. |
| 5,870,924 A | 2/1999 | Fahimi et al. |

(Continued)

FOREIGN PATENT DOCUMENTS

| | | |
|---|---|---|
| GB | 2513572 A | 11/2014 |
| KR | 100323624 B1 | 3/2002 |

(Continued)

OTHER PUBLICATIONS

Engelen et al. "A non-skiving tape head with sub-ambient air pressure cavities," 2015 IEEE International Magnetics Conference (Intermag), Beijing, 2015, pp. 1-1, doi: 10.1109/Intmag.2015.7157659.

(Continued)

*Primary Examiner* — William J Klimowicz
(74) *Attorney, Agent, or Firm* — Patterson + Sheridan, LLP

(57) ABSTRACT

The present disclosure generally relates to a head assembly in a data storage device. The data storage device may include magnetic media embedded in the device or magnetic media from an insertable cassette or cartridge (e.g., in an LTO drive), where the head assembly reads from and writes to the magnetic media. During device operation, the magnetic media moves across the head assembly. The magnetic media experiences higher contact stress at certain points or portions of the head assembly. A sensor guard is coupled to the head assembly. The sensor guard comprises at least one chamfered surface or at least one stepped surface to decrease the contact stress between the magnetic media and the head assembly during device operation. The at least one chamfered or stepped surface may be disposed on a leading edge of the sensor guard.

20 Claims, 10 Drawing Sheets

Related U.S. Application Data continuation-in-part of application No. 17/184,547, filed on Feb. 24, 2021, now abandoned.

(60) Provisional application No. 63/068,632, filed on Aug. 21, 2020.

(51) Int. Cl.
*G11B 5/40* (2006.01)
*G11B 15/60* (2006.01)

(56) References Cited

U.S. PATENT DOCUMENTS

| | | | |
|---|---|---|---|
| 5,883,770 | A | 3/1999 | Biskeborn et al. |
| 6,040,964 | A * | 3/2000 | Saliba .................... G11B 5/255 |
| 6,118,626 | A | 9/2000 | Muftu et al. |
| 6,122,147 | A | 9/2000 | Fahimi et al. |
| 6,647,613 | B2 | 11/2003 | Beck et al. |
| 6,972,931 | B2 | 12/2005 | Rudi et al. |
| 7,133,261 | B2 | 11/2006 | Biskeborn |
| 7,646,565 | B2 | 1/2010 | Biskeborn et al. |
| 7,660,072 | B2 | 2/2010 | Biskeborn et al. |
| 8,009,386 | B2 * | 8/2011 | Hachisuka ............ G11B 5/1871 360/122 |
| 8,542,460 | B2 | 9/2013 | Biskeborn et al. |
| 8,958,175 | B1 | 2/2015 | Lakshmikumaran et al. |
| 9,030,779 | B2 | 5/2015 | Dellmann et al. |
| 9,691,414 | B1 | 6/2017 | Biskeborn et al. |
| 9,734,854 | B2 | 8/2017 | Engelen et al. |
| 9,837,104 | B1 | 12/2017 | Biskeborn |
| 10,062,397 | B2 * | 8/2018 | Biskeborn .............. G11B 5/255 |
| 10,068,591 | B2 | 9/2018 | Biskeborn et al. |
| 10,304,481 | B2 | 5/2019 | Biskeborn |
| 10,991,390 | B2 | 4/2021 | Kobayashi |
| 2003/0021062 | A1 | 1/2003 | Kanno et al. |
| 2004/0047076 | A1 | 3/2004 | Rudi et al. |
| 2008/0049358 | A1 | 2/2008 | Biskeborn et al. |
| 2008/0170328 | A1 | 7/2008 | Kawakami et al. |
| 2009/0135520 | A1 * | 5/2009 | Hachisuka ........... G11B 5/3106 360/122 |
| 2009/0231757 | A1 | 9/2009 | Biskeborn et al. |
| 2012/0008234 | A1 | 1/2012 | Biskeborn et al. |
| 2012/0300338 | A1 | 11/2012 | Biskeborn |
| 2015/0194173 | A1 | 7/2015 | Dellmann et al. |
| 2015/0364154 | A1 | 12/2015 | Holmberg et al. |
| 2016/0055867 | A1 | 2/2016 | Engelen et al. |
| 2016/0189738 | A1 | 6/2016 | Lakshmikumaran et al. |
| 2018/0158472 | A1 | 6/2018 | Biskeborn et al. |
| 2020/0258544 | A1 | 8/2020 | Kobayashi |
| 2022/0115037 | A1 | 4/2022 | Kuroki et al. |

FOREIGN PATENT DOCUMENTS

| | | | |
|---|---|---|---|
| WO | WO-9503606 A1 * | 2/1995 | ............ G11B 15/62 |
| WO | 2014149055 A1 | 9/2014 | |

OTHER PUBLICATIONS

Reininger et al. "A Model for Head/Tape Friction for Smooth Media," Tribol Lett, 2017, No. 65, vol. 65, pp. 1-6, <https://doi.org/10.1007/s11249-017-0848-2>.

Reininger, P. et al., "A Model for Head/Tape Friction for Smooth Media", Springer Science+Business Media, 2017, pp. 1-6.

Xiong, S. et al., "Magnetic Tape", Science Direct, May 15, 2020, pp. 1-11.

Engelen, J. B. et al., "A Non-Skiving Tape Head with Sub-Ambient Air Pressure Cavities", Intermag, 2015.

* cited by examiner

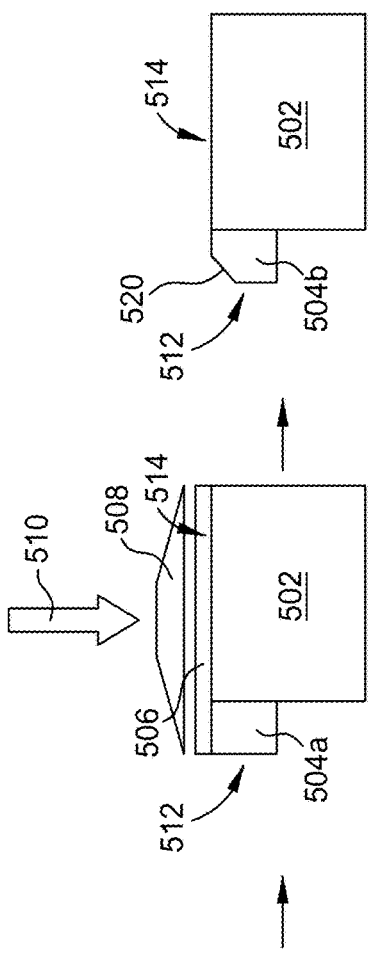

REDUCTION OF HIGH TAPE CONTACT PRESSURE POINTS AGAINST HEAD ASSEMBLY

CROSS-REFERENCE TO RELATED APPLICATIONS

This application is a divisional of co-pending U.S. patent application Ser. No. 17/991,620, filed Nov. 21, 2022, which is a continuation-in-part of U.S. patent application Ser. No. 17/184,547, filed Feb. 24, 2021, which application claims priority to U.S. Provisional Patent Application Ser. No. 63/068,632, filed Aug. 21, 2020. Each of the aforementioned related patent applications is herein incorporated by reference.

BACKGROUND OF THE DISCLOSURE

Field of the Disclosure

Embodiments of the present disclosure generally relate to a head assembly of a data storage device.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head (i.e., magnetic recording head) to record and read back information from tapes by magnetic processes. The tape head comprises servo elements and data elements that are arranged in an array that is oftentimes referred to as a tape head array. Tape drives also have sensors as well as motors.

In operation, the tape drive system has many moving parts such as a tape (i.e., magnetic media) that moves between two reels. In between the two reels, the tape rolls over numerous rollers guiding the tape to a reading or writing position in front of the head. When the tape comes into contact with the tape head, the tape may experience contact stress that may result in the wear and tear of the tape, resulting in decreased lifespan and lower reliability.

Therefore, there is a need in the art for an improved tape head that reduces the contact stress between the tape and the tape head.

SUMMARY OF THE DISCLOSURE

The present disclosure generally relates to a head assembly in a data storage device. The data storage device may include a magnetic media embedded in the device or magnetic media from an insertable cassette or cartridge (e.g., in an LTO Drive), where the head assembly reads from and writes to the magnetic media. During device operation, the magnetic media moves across the head assembly. The magnetic media experiences higher contact stress at certain points or portions of the head assembly. A sensor guard is coupled to the head assembly. The sensor guard comprises at least one chamfered surface or at least one stepped surface to decrease the contact stress between the magnetic media and the head assembly during device operation. The at least one chamfered or stepped surface may be disposed on a leading edge of the sensor guard.

In one embodiment, a magnetic recording head assembly, configured to read from and write to a magnetic media, includes one or more rows of chiplets one or more rows of chiplets, each of the one or more rows of chiplets having a leading edge, a trailing edge, a first side edge, and a second side edge, the first and second side edges being disposed between the leading edge and the trailing edge, and one or more sensor guards disposed adjacent to at least one of the first side edge and the second side edge of each of the one or more of rows of chiplets, wherein each of the one or more sensor guards comprises a first surface disposed at a media facing surface (MFS), a second surface disposed perpendicular to the first surface, and a chamfered surface coupling the first surface to the second surface.

In another embodiment, a data storage device includes a magnetic recording head assembly. The magnetic recording head, configured to read from and write to a magnetic media, includes one or more rows of chiplets one or more rows of chiplets, each of the one or more rows of chiplets having a leading edge, a trailing edge, a first side edge, and a second side edge, the first and second side edges being disposed between the leading edge and the trailing edge, and one or more sensor guards disposed adjacent to at least one of the first side edge and the second side edge of each of the one or more of rows of chiplets, wherein each of the one or more sensor guards comprises a first surface disposed at a MFS, a second surface disposed perpendicular to the first surface, a third surface disposed perpendicular to the first surface and parallel to the second surface, where the third surface is coupled to the first surface, and a fourth surface disposed perpendicular to the second surface and parallel to the first surface, where the fourth surface is coupled to the second surface and the third surface.

In another embodiment, a magnetic recording head assembly configured to read from and write to a magnetic media comprising one or more rows of chiplets, each of the one or more rows of chiplets having a leading edge, a trailing edge, a first side edge, a second side edge, and a media facing surface (MFS), wherein: the first and second side edges are disposed between the leading edge and the trailing edge, and the first side edge comprises a first chamfered surface disposed adjacent to the MFS and a first outer side surface of each of the one or more rows of chiplets, the first outer side surface being disposed perpendicular to the MFS.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5D illustrate a method of forming a chamfered sensor guard, in accordance with some embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a head assembly in a data storage device. The data storage device may include magnetic media embedded in the device or magnetic media from an insertable cassette or cartridge (e.g., in an LTO drive), where the head assembly reads from and writes to the magnetic media. During device operation, the magnetic media moves across the head assembly. The magnetic media experiences higher contact stress at certain points or portions of the head assembly. A sensor guard is coupled to the head assembly. The sensor guard comprises at least one chamfered surface or at least one stepped surface to decrease the contact stress between the magnetic media and the head assembly during device operation. The at least one chamfered or stepped surface may be disposed on a leading edge of the sensor guard.

Figure 1A:
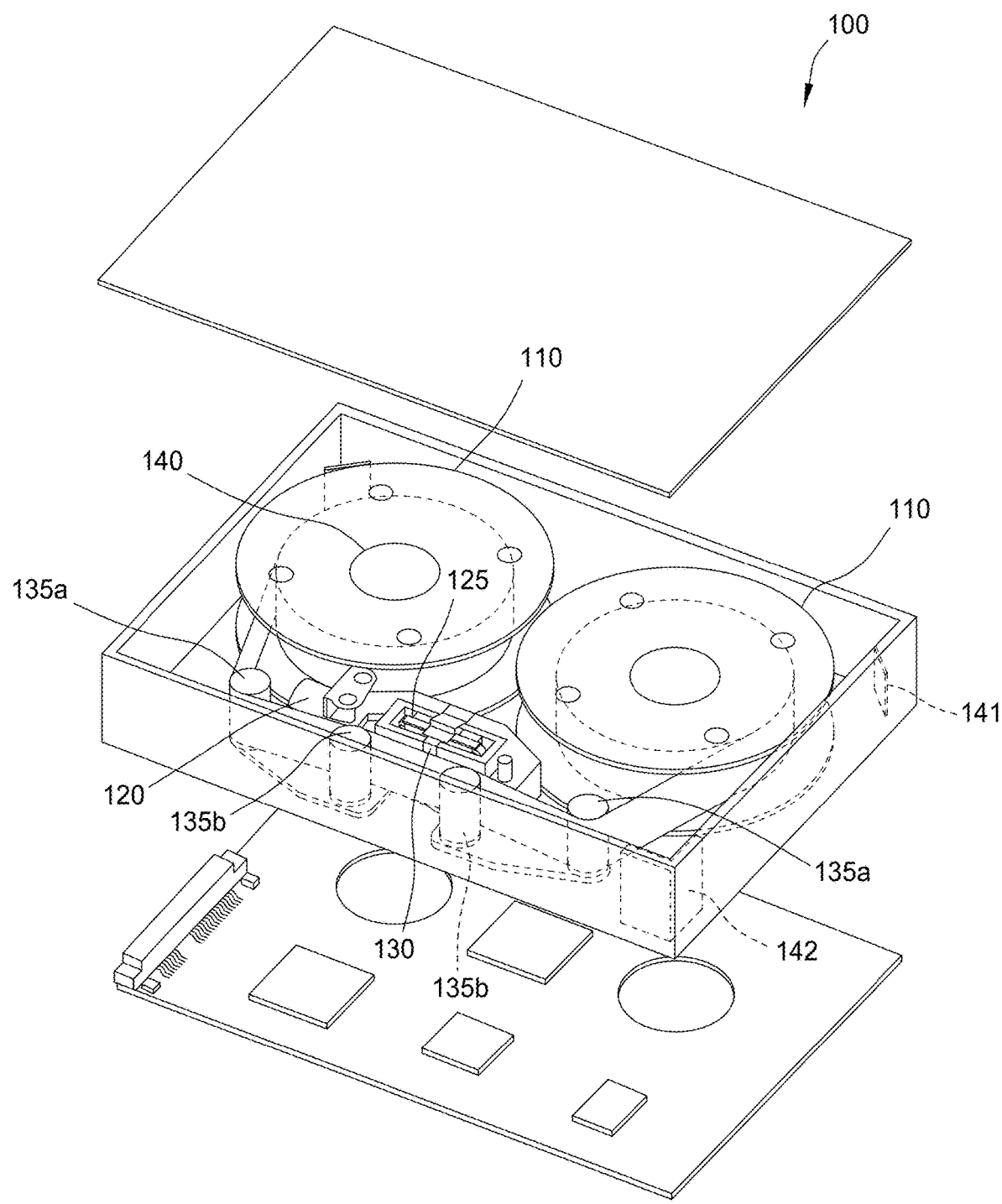
FIGS. 1A-1C illustrate a perspective exploded view and a simplified top down and side profile view of a tape embedded drive, in accordance with some embodiments.
Figure 1B:
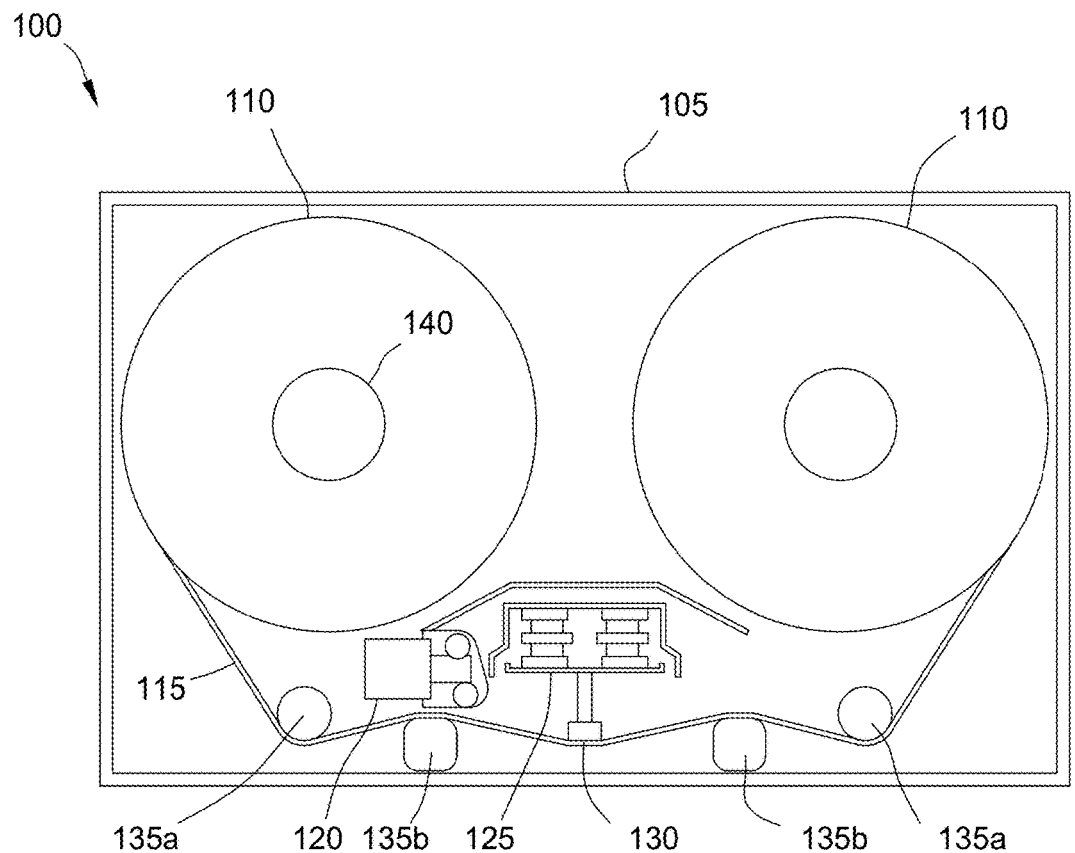
Figure 1C:
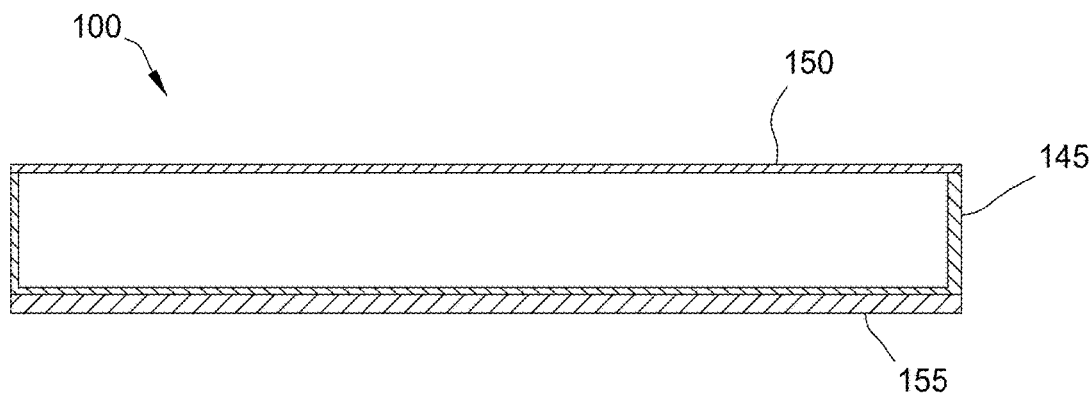

FIGS. 1A-1C illustrate a perspective exploded view and a simplified top down and side profile view of a tape embedded drive (TED) 100, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape embedded drive further comprises a printed circuit board assembly (PCBA). In an embodiment, most of the components are within an interior cavity of the casing, except the PCBA, which is mounted on an external surface of the casing. The same components are illustrated in a perspective view in FIG. 1A. In the descriptions herein, the term "tape" may be referred to as "magnetic media", interchangeably, for exemplary purposes.

It is to be understood that the magnetic recording head assembly discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," application. Ser. No. 16/365,034, filed Mar. 31, 2019, assigned to the same assignee of this application. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

In the illustrated embodiments, two tape reels 110 are placed in the interior cavity of the casing, with the center of the two tape reels on the same level in the cavity and with the head assembly 130 located in the middle and below the two tape reels. Tape reel motors located in the spindles of the tape reels can operate to wind and unwind the tape media 115 in the tape reels. Each tape reel may also incorporate a tape folder to help the tape media 115 be neatly wound onto the reel. The tape media may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 11B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor and stepping motor may variably position the tape head(s) transversely with respect to the width of the recording tape. The stepping motor may provide coarse movement, while the voice coil motor may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing. In particular, as the head mechanism is internal to the casing in certain embodiments, the tape media 115 may not be exposed to the outside of the casing, such as in conventional tape drives. Thus, the tape media 115 does not need to be routed along the edge of the casing and can be freely routed in more compact and/or otherwise more efficient ways within the casing. Similarly, the head(s) and tape reels may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside casing for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

Figure 2:
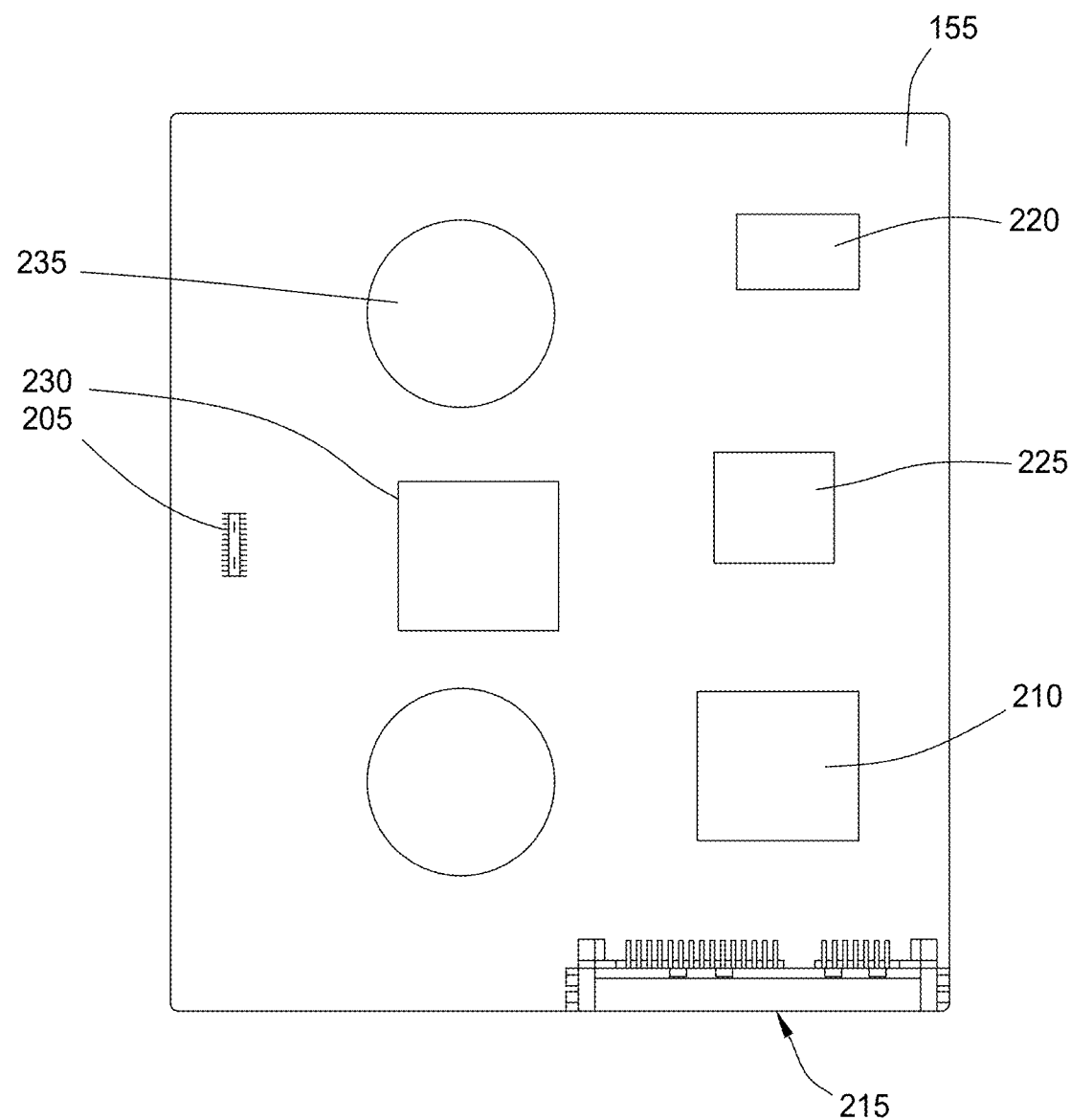
FIG. 2 illustrates a top perspective view of a printed circuit board assembly (PCBA) of the tape embedded drive, in accordance with some embodiments.

FIG. 2 illustrates a top perspective view of a printed circuit board assembly (PCBA) 155 of the tape embedded drive 100, in accordance with some embodiments. The PCBA 155 of the tape embedded drive may be the PCBA 155 of FIG. 1. The PCBA 155 is attached to the bottom surface of the casing, with a connector 205 attaching to contacts or an interface on the bottom surface electrically/electronically connected to internal components in the casing. For example, the contacts or interface may be electrically connected to one or more motors and/or actuators within the casing. In one embodiment, the contacts/interface are built into the casing without comprising an air tight seal of the casing. In some embodiments, the connector 205 may be an electrical feed-through electrically connecting components inside the casing to those on the PCBA, while maintaining sealing of the casing.

The PCBA 155 can include various components, such as one or more controllers, one or more connectors 205, a system on a chip (SoC) 210, one or more data interfaces 215 (e.g., Serial ATA (SATA), Serial Attached SCSI (SAS), non-volatile memory express (NVMe), or the like), a memory 220, a Power Large Scale Integration (PLSI) 225, and/or data read channel controller 230. One or more cutouts 235 can be added in the PCBA 155 to provide additional space for tape reel motors, if needed. For example, the portion of the casing above the tape reel motors may be raised to provide additional space for the motors. By providing cutouts 235, the thickness of the tape embedded drive 100 may be reduced as the PCBA 155 may surround the raised portion of the casing.

The PCBA 155 may extend along the entire bottom exterior surface of the casing 105 or may only partially extend along the surface, depending on how much space the various components need. In some embodiments, a second PCBA 155 may be located internally in the casing 105 and be in communication with the first PCBA 155, for example, via the connector 205.

In some embodiments, a controller on the PCBA 155 controls the read and write operations of the tape embedded drive 100. The controller may engage the tape spool motors and cause the tape spools to wind the tape film forwards or backwards. The controller may use the stepping motor and the voice coil motor to control placement of the head(s) over the tape film. The controller may also control output/input of data to or from the tape embedded drive 100 through the one or more interfaces 215, such as SATA or SAS.

While the above discusses the tape embedded drive 100 as having a casing with a 3.5 inch form factor like that of HDDs, the tape embedded drive 100 may use other form factors. For example, if tape technology become sufficiently miniaturized in the future, then the tape embedded drive could use a 2.5 inch drive form factor, like that used by laptop HDDs. In some embodiments, where larger sizes are desired, the tape embedded drive 100 may use a 5.25 inch drive form factor for the casing, such as those used by computer CD-ROMs. Furthermore, the tape embedded drive 100 may use the 3.5 inch form factor with some variations. For example, the drive may be slightly longer/shorter, slightly thicker/thinner, or the like. Even with slight differences in dimensions or placement of data/power interfaces, the drive 100 may still be compatible with existing 3.5 inch drive form factor based infrastructure found in various computer equipment, such as racks and servers.

Figure 3:
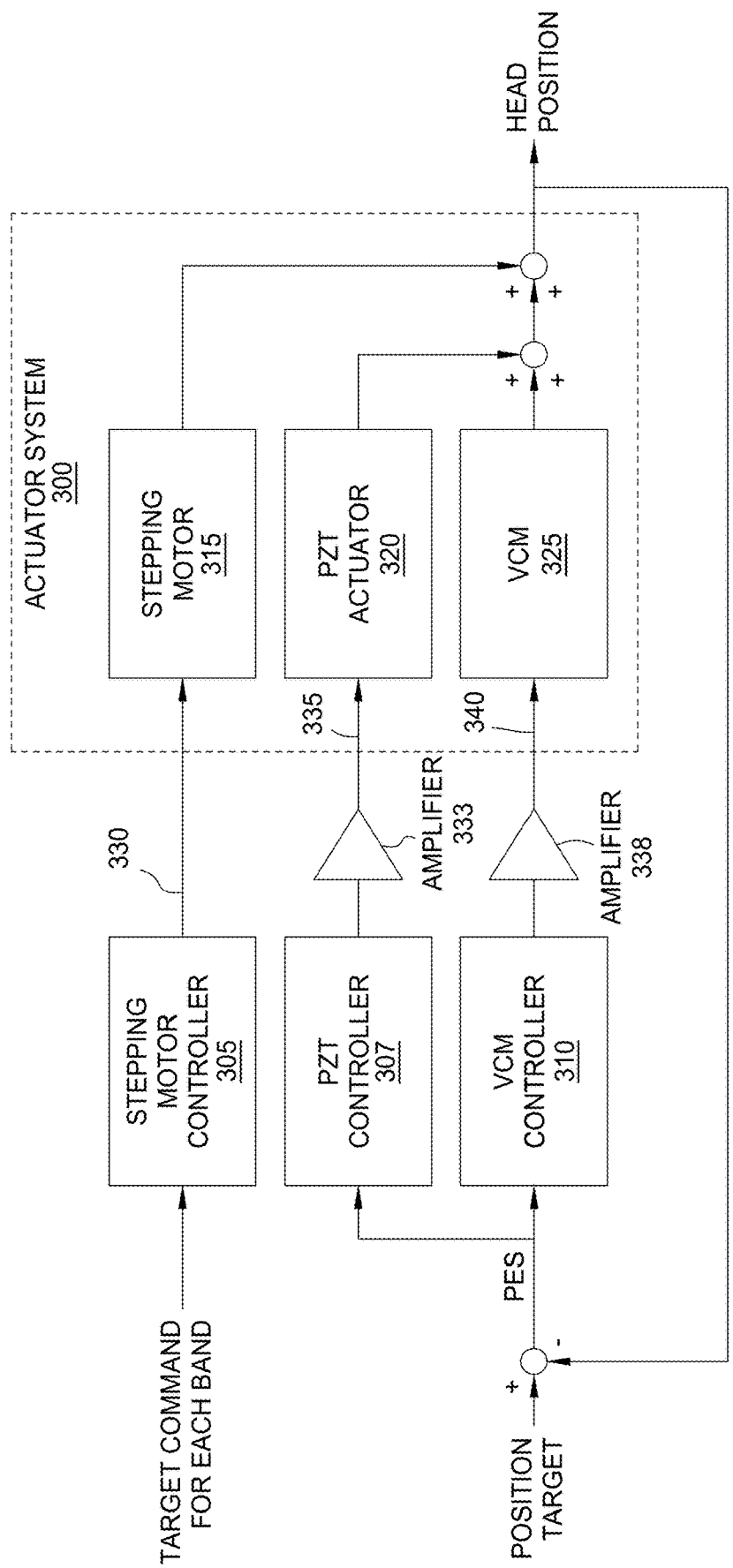
FIG. 3 illustrates a control block diagram for a servo-mechanical system of the tape embedded drive, in accordance with some embodiments.

FIG. 3 illustrates a control block diagram for a servo-mechanical system, such as an actuator system 300, of the tape embedded drive 100, in accordance with some embodiments. The control logic for the system may be implemented as a process in one or more controllers of the tape embedded drive 100, such as the SoC and/or PLSI in the PCBA and used to control one or more motors and/or one or more actuators.

In an embodiment, a stepping motor controller 305, a PZT controller 307, and a VCM controller 310 work together to control a stepping motor 315, a PZT actuator 320, and a VCM 325 to coordinate the movement of the head(s) in response to a target command.

As discussed above, the stepping motor 315 may provide coarse movement, the VCM 325 may provide fine movement, and the PZT actuator 320 may provide very fine movement. For example, assuming a 12.65 mm tape width, the stepping motor stroke may be about 12.65 mm, with the VCM stroke at about 4 mm, and the PZT stroke at about 4 µm. In this embodiment, the various strokes creates a movement ratio of about 30,000:10,000:1 (stepping motor: VCM:PZT actuator). In other embodiments, the ratios may be different based on the performance specifications of the motors and the actuators.

A first control signal 330 is sent from the stepping motor controller to the stepping motor. The head(s) are then moved in a coarse movement. In an embodiment, a head position sensor detects the position of the head(s) after the first movement and provides a positive error signal (PES) to the VCM and PZT controllers. In response, the VCM and the PZT controllers may further move the head(s) in a fine and a very fine movement, respectively, if needed, to place the head(s) into the desired position.

A first amplifier 333 may be positioned in between the PZT controller 307 and the PZT actuator 320 to amplify a second control signal 335. A second amplifier 338 may be positioned in between the VCM controller 310 and the VCM 325 to amplify a third control signal 340.

In an embodiment, the PZT actuator 320 and the VCM 325 move the head(s) serially. The VCM first moves the head(s) and then, if the head(s) are within a first threshold distance from the target position, the PZT actuator 320 may take over the movement of the head(s) for very fine movements. In another embodiment, the PZT actuator 320 and the VCM 325 may move the head(s) in parallel. It should be noted that although PZT is used throughout in the description of the control system of FIG. 3, as disclosed above, other types of actuators may be used in place of PZTs, and the system of FIG. 3 may be adapted accordingly in other embodiments.

Figure 4A:
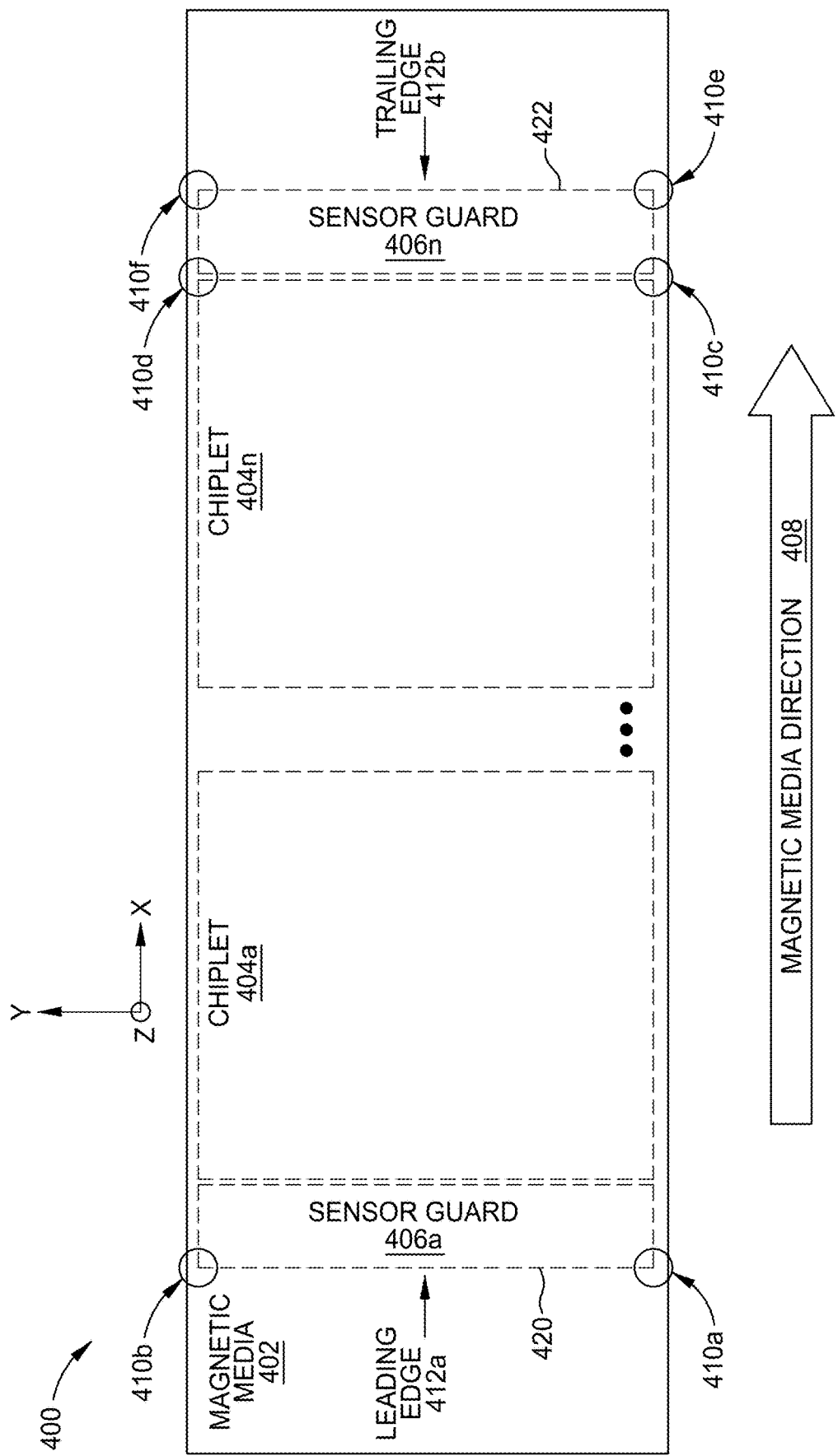
FIGS. 4A-4B illustrate a magnetic media with respect to a head assembly, in accordance with some embodiments.
Figure 4B:
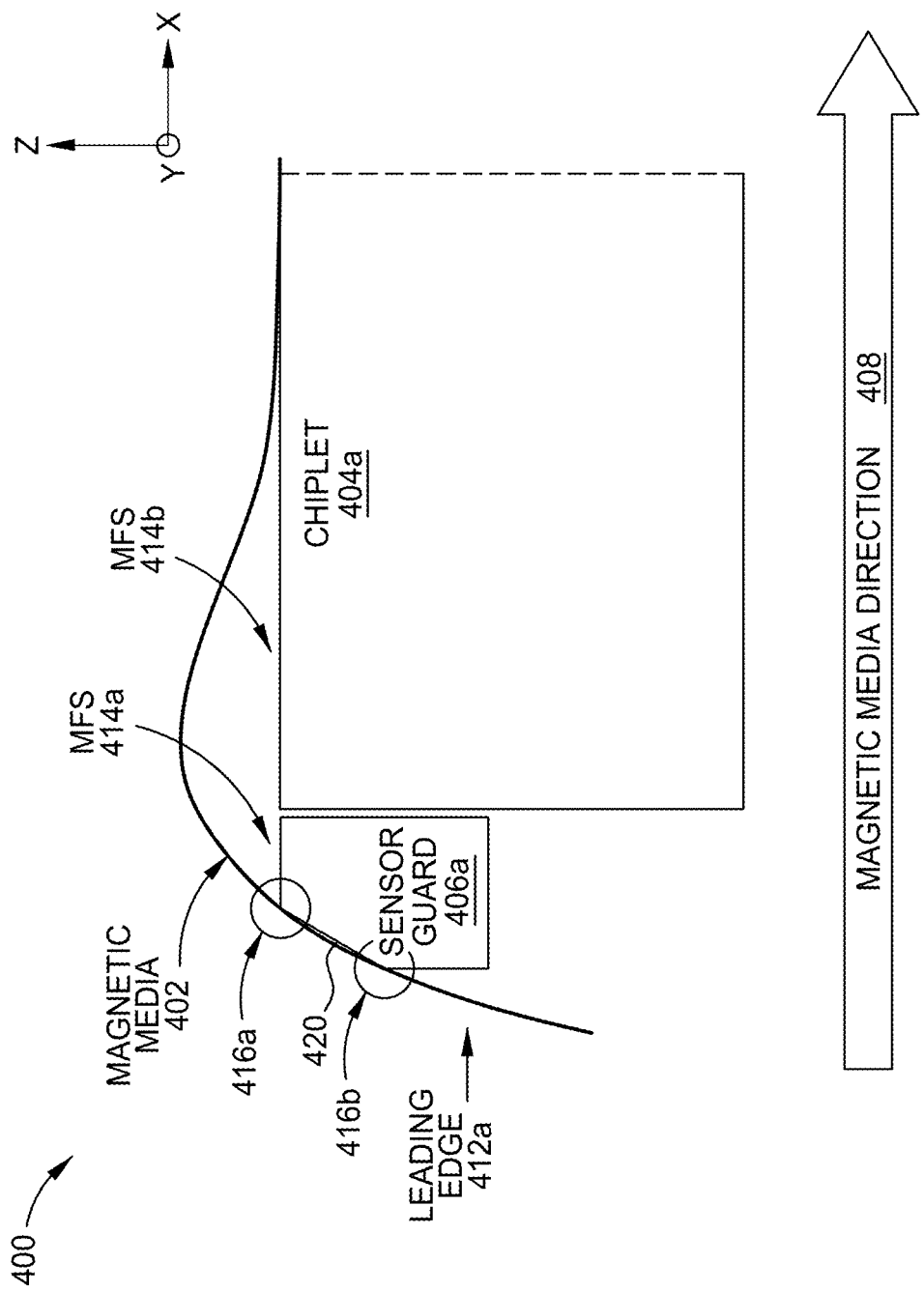

FIGS. 4A-4B illustrate a magnetic media 402 with respect to a head assembly 400, in accordance with some embodiments. FIG. 4A is a top view of the magnetic media 402 with respect to the head assembly 400, according to one embodiment. FIG. 4B is a side view of the magnetic media 402 with respect the head assembly 400, according to one embodiment. The magnetic media 402 may be the tape media 115 of FIG. 1. Furthermore, the head assembly 400 may be the head assembly 130 of FIG. 1. The head assembly 400 includes one or more chiplets 404a-404n, where the one or more chiplets 404a-404n may be mini-chiplets. Each of the one or more chiplets 404a-404n may be either a read chiplet or a write chiplet corresponding to one or more read heads (not shown) or one or more write heads (not shown) of the head assembly 400. The head assembly 400 may comprise one or more rows of one or more chiplets 404a-404n, such that an additional row(s) may be disposed adjacent to the row of one or more chiplets 404a-404n in the y-direction.

The head assembly 400 further comprises one or more sensor guards 406a-406n. In one embodiment, each row of chiplets comprises a sensor guard 406a. In another embodiment, each chiplet 404a-404n comprises a sensor guard 406a-406n. In yet another embodiment, each of the chiplets 404a-404n comprises two sensor guards 406a-406n, where one sensor guard 406a-406n is disposed adjacent to both sides of each chiplet. The plurality of sensor guards 406a-406n may protect the head assembly 400 from wear resulting from the friction from the magnetic media 402 as the magnetic media moves across the head assembly 400 in the magnetic media direction 408.

The magnetic media 402 moves in the positive x-direction as indicated by the arrow representing the magnetic media direction 408. It is to be understood that the vector (x,y,z) representation of the movement of the magnetic media 402 is not limiting and is an example of a possible direction of the movement of the magnetic media 402. Furthermore, the leading edge 412a and the trailing edge 412b of the head assembly is determined by the magnetic media direction 408. For example, in FIG. 4A, a leading edge surface 420 is the primary point of contact of the magnetic media 402 and a trailing edge surface 422 is the latter point of contact, such that when the section of the magnetic media 402 moves past the trailing edge 412b, the section of the magnetic media 402 is no longer in contact with the head assembly 400. However, if the magnetic media 402 is moving in the opposite direction of the magnetic media direction 408 shown, then the trailing edge 412b depicted is the leading edge and the leading edge 412a depicted is the trailing edge. While not shown in FIG. 4A, at least the leading edge surface 420 is chamfered or stepped, as discussed further below.

When the magnetic media 402 moves in the magnetic media direction 408 during the operation of the data storage device, such as the TED 100 of FIG. 1, one or more points or one or more sections of the magnetic media 402 may experience more stress than other one or more points or one or more sections. The additional stress that the one or more points or one or more sections experience may result increased wear of the magnetic media 402, such that the magnetic media may no longer be reliable. However, by causing the magnetic media 402 to contact the sensor guard at two or more points, such as in a stepped sensor guard design, a straight chamfer sensor guard design, or a convex chamfer sensor guard design, the contact stress that the magnetic media 402 may experience may be reduced.

For example, potential locations where the magnetic media 402 may experience more stress as the magnetic media 402 moves in the magnetic media direction 408 may be at a plurality of locations 410a-410f or surfaces 420, 422. It is to be understood that more than or less than the described number of greater stress locations may exist on the magnetic media 402 as the magnetic media 402 moves across the head assembly 400. The magnetic media 402 may experience greater stress at a first location 410a and a second location 410b than at the other locations, or at the lead edge surface 420. The greater stress locations generally correspond with the leading edge 412a of the head assembly 400.

In FIG. 4B, a sensor guard 406a is disposed at a leading edge 412a of the head assembly 400. A first chiplet 404a is disposed adjacent to the sensor guard 406a, where a first media facing surface (MFS) 414a of the sensor guard 406a and the second MFS 414b of the chiplet 404a are in line with each other (i.e., form one continuous MFS). One or more chiplets (not shown) may be disposed behind the first chiplet 404a in a row in the y-direction. In some embodiments, the location 416a may correspond with the first location 410a, the second location 410b, or the leading edge surface 420 of the sensor guard 406a. The location 416a is where the magnetic media 402 contacts the MFS 414a and the location 416b is where the magnetic media 402 contacts the leading edge 412a. It is to be understood that while two locations 416a, 416b are shown, the magnetic media may contact any number of locations of the sensor guard 406a. As shown, the leading edge surface 420 of the sensor guard 406a is chamfered or beveled (sometimes referred to as chamfered surface 420 or chamfered edge 420). Thus, rather than the leading edge surface 420 protruding out at a right angle, the leading edge surface 420 is angled, stepped, or rounded. The chamfered edge 420 may be curved, convex, stepped, or straight, as discussed further below in FIGS. 6A-6C. In some embodiments, a leading edge of the chiplet 404a itself may be chamfered, rather than the sensor guard 406a.

The chamfered edge 420 has a ratio of depth in the z-direction to width in the x-direction between about 0.01 and about 0.2. The ratio of depth to width describes the depth to width ratio of the leading edge surface 420 of the sensor guard 406a. In some embodiments, the ratio of depth to width describes the depth to width ratio of the corners, such as any location 410a-410f, of the plurality of sensor guards 406a-406n. Because of the chamfered edge 420 of the sensor guard 406a, the stress that magnetic media 402 may experience may be less than the stress that the magnetic media 402 may experience without a chamfered edge (i.e., when the leading edge surface protrudes out at a right angle). It is noted that although a tape embedded drive from FIG. 1 is referenced as an example, the magnetic media 402 does not need to be embedded within the storage device, and may be from an insertable cartridge or cassette such as that conventionally used in an LTO tape drive.

FIGS. 5A-5D illustrate a method of forming a chamfered sensor guard 504b, in accordance with some embodiments. The sensor guard 504b may be the sensor guard 406a of FIG. 4B. FIG. 5A illustrates a sensor guard 504a disposed adjacent to a chiplet 502, where the leading edge 512 is at the side of the sensor guard 504b opposite to the chiplet 502. The MFS 514 is at a top surface of both the sensor guard 504a and the chiplet 502. Additional sensor guards may disposed about any side of the chiplet 502 to form one or more rows for sensor guards, where the MFS of each of the additional sensor guards is in line with the top edge of the chiplet 502.

In FIG. 5B, a photoresist 506 is disposed over the MFS 514 of the sensor guard 504a and the chiplet 502. In embodiments where a plurality of chiplets are disposed in a row, the photoresist 506 is deposited on the MFS 514 of each chiplet in the row of chiplets. The photoresist 506 may have a thickness of about 5 μm to about 30 μm, such as about 10 μm to about 20 μm. In FIG. 5C, a gray scale mask 508 is deposited over the photoresist 506. The gray scale mask 508 may be deposited in a pyramid-like shape such that the center of the gray scale mask 508 is thicker than the ends or edges of the gray scale mask 508. In one embodiment, at least the leading edge end of the gray scale mask 508 is thinner than a center of the gray scale mask 508.

When light 510 is applied to the gray scale mask 508, the gray scale mask transfers the gradient photoresist pattern to the sensor guard 504a and the chiplet 502. Furthermore, in FIG. 5C, the photoresist 506 is etched, such that part of the sensor guard 504a is etched or removed. In FIG. 5D, the photoresist 506 and the gray scale mask 508 are removed, and the resulting chamfered edge 520 of the sensor guard 504b is revealed. One or more other surfaces of the sensor guard 504b may be chamfered as well, such as the corners of the leading edge and/or a trailing edge surface.

Figure 6A:
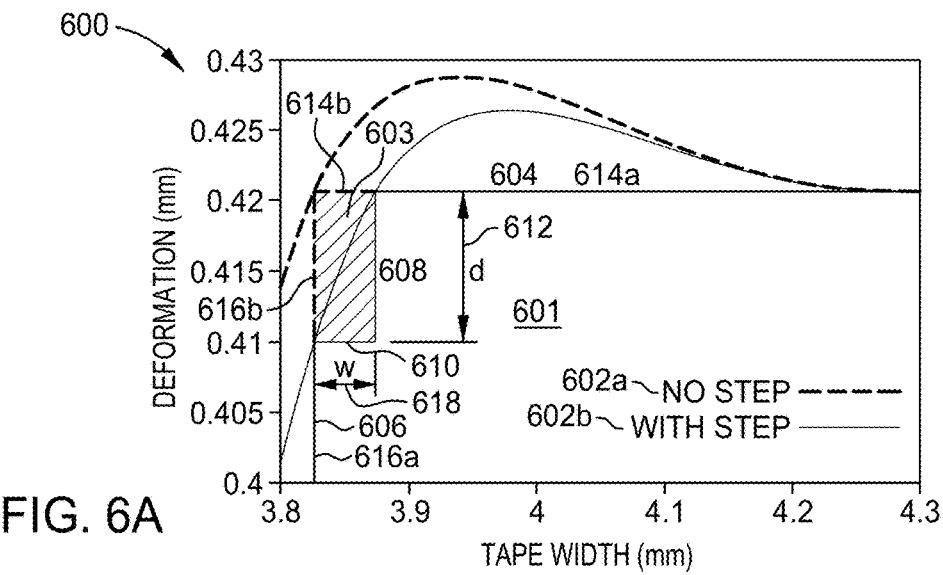
FIGS. 6A-6C illustrate various sensor guards comprising a chamfered or stepped surface, in accordance with various embodiments.
Figure 6B:
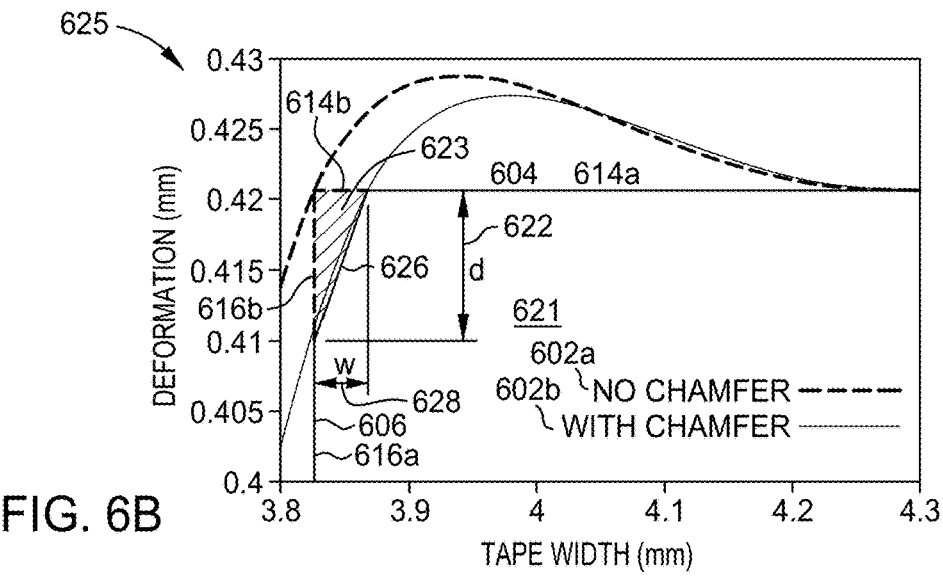
Figure 6C:
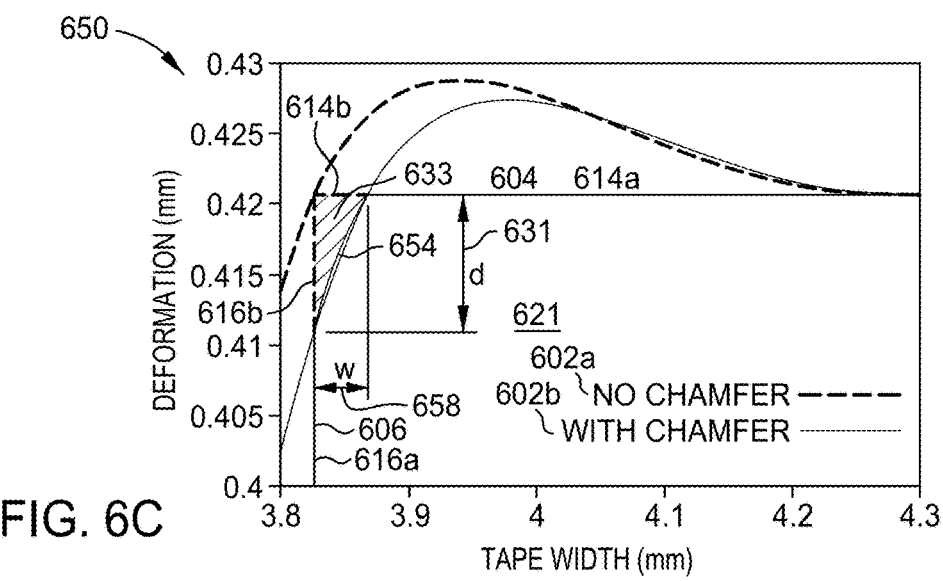

FIGS. 6A-6C illustrate graphs comparing various embodiments of chamfered or stepped sensor guards to conventional or non-chamfered sensor guards, in accordance with some embodiments. In the graph 600 of FIG. 6A, the graph 625 of FIG. 6B, and the graph 650 of FIG. 6C, the y-axis is deformation of the magnetic media in mm and the x-axis is the magnetic media width in mm. While FIGS. 6A-6C refer to the sensor guard of the head assembly comprising a chamfered or stepped surface, each chiplet or row of chiplets may comprise a chamfered or stepped surface instead. Thus, it is to be understood that the embodiments discussed herein apply to both chiplets and sensors guards. Moreover, the stepped head assembly 601 of FIG. 6A, the straight chamfered head assembly 621 of FIG. 6B, and the convex chamfered head assembly 631 of FIG. 6C may each individually be the sensor guard 406a and the head assembly 400 of FIGS. 4A-4B.

In FIGS. 6A-6C, the path the magnetic media may travel as the magnetic media move across the head assemblies is illustrated by a first line 602a and a second line 602b, where the first line 602a represents the magnetic media 602a in a conventional or a non-chamfered sensor guard design and the second line 602b represents the magnetic media 602b in a stepped or a chamfered sensor guard design, such as the magnetic media 402, the sensor guard 406a, and the head assembly 400 of FIG. 4A-4B. In the embodiments herein, the sensor guard and the head assembly may be referenced together as the stepped or chamfered head assembly, for exemplary purposes. Furthermore, the term "chamfer" may alternatively be referred to as "bezel" or any other term to describe a sloping surface coupling a first surface to a second surface. The term "chamfered" as used herein encompasses a stepped surface, as described in FIG. 6A.

FIG. 6A illustrates a graph 600 comparing a cross-sectional view of a stepped head assembly 601 to a cross-sectional view of a conventional head assembly 603, according to one embodiment. As shown in the graph 600, the footprint of the stepped head assembly 601 is overlaid on top of that of the conventional head assembly 603. The stepped head assembly 601 may be the head assembly 400 of FIGS. 4A-4B. The x-axis illustrates the tape width in millimeters, where each tick of the x-axis is incremented by 0.1 mm from the value of the previous tick. The y-axis illustrates the tape height deformation in millimeters, where each tick of the y-axis is incremented by 0.005 mm from the value of the previous tick.

The conventional head assembly 603 includes a first section 614a and a second section 614b of a first surface, where the first surface may be referred to as a first surface 614, and a first section 616a and a second section 616b of a second surface, where the second surface may be referred to as a second surface 616. The stepped head assembly 601 comprises a first surface 604 disposed at the MFS and a second surface 606 disposed on the leading edge. Furthermore, the first surface 604 may be referred to as a MFS 604 and the second surface 606 may be referred to as a leading edge surface 606 or a side edge surface 606 (like discussed below in FIGS. 7A-8).

A third surface 608 of the stepped head assembly 601 is disposed perpendicular to the first surface 604, where the third surface 608 is coupled to the first surface 604 at a first distance 618 or width from the leading edge surface 606. A fourth surface 610 is disposed perpendicular to the second surface 606 and the third surface 608, where the fourth surface 610 is coupled to the third surface 608 at a second distance 612 or depth from the MFS 604, and is further coupled to the second surface 606. Furthermore, the first surface 604 and the fourth surface 610 are disposed parallel to each other, and the second surface 606 and the third surface 608 are disposed parallel to each other. The first surface 604 terminates a point that is recessed by the first distance 618 from the leading edge surface, and the second surface 606 terminates at a point that is recessed by the second distance 612 from the MFS. While the intersections or corners of the first, second, third, and fourth surfaces 604, 606, 608, 610 are shown as points, the intersections or corners may be rounded.

In one embodiment, the first distance 618 is substantially greater than the second distance 612. The first distance 618 may be represented by "w", where "w" represents a difference in the width of the stepped head assembly 601 and the conventional head assembly 603. The second distance 612 may be represented by "d", where "d" represents a difference in depth of the stepped head assembly 601 and the conventional head assembly 603. The first distance 618 is between about 20 μm to about 100 μm, and the second distance 612 is between about 5 μm to about 25 μm. Furthermore, the ratio of depth to width is between about 0.01 to about 0.2. For example, when "w" is about 0.5 mm and "d" is about 0.01 mm, as illustrated in the graph 600, the ratio of depth to width is about 0.01:0.5 or about 0.02. The listed dimensions and the listed ratios are not intended to be limiting, but to provide examples of possible embodiments.

Unlike the conventional head assembly 603, where the magnetic media 602*a* is in contact with only one edge of the conventional head assembly 603, the magnetic media 602*b* of the stepped head assembly 601 may be in contact with both a first edge and a second edge, where the first edge is formed by the intersection of the first surface 604 and the third surface 608, and the second edge is formed by the intersection of the second surface 606 and the fourth surface 610. As such, the magnetic media 602*a* of the conventional head assembly 603 rises much higher over the first surface 614 than the magnetic media 602*b* rises over the first surface 604 of the stepped head assembly 601. The magnetic media 602*b* rising lower over the first surface 604 of the convex stepped head assembly 601 results in less deformation of the magnetic media 602*b*.

FIG. 6B illustrates a graph 625 comparing a cross-sectional view of a straight chamfered head assembly 621 to a cross-sectional view of a conventional head assembly 623, according to one embodiment. As shown in the graph 625, the footprint of the straight chamfered head assembly 621 is overlaid on top of that of the conventional head assembly 623. The straight chamfered head assembly 621 may be the head assembly 400 of FIGS. 4A-4B. The x-axis illustrates the tape width in millimeters, where each tick of the x-axis is incremented by 0.1 mm from the value of the previous tick. The y-axis illustrates the tape height deformation in millimeters, where each tick of the y-axis is incremented by 0.005 mm from the value of the previous tick.

The conventional head assembly 623 includes a first section 614*a* and a second section 614*b* of a first surface, where the first surface may be referred to as a first surface 614, and a first section 616*a* and a second section 616*b* of a second surface, where the second surface may be referred to as a second surface 616. The straight chamfered head assembly 621 comprises a first surface 604 disposed at the MFS, a second surface 606 disposed on the leading edge, and a chamfered surface 626 connecting the first surface 604 to the second surface 606. Furthermore, the first surface 604 may be referred to as a MFS 604 and the second surface 606 may be referred to as a leading edge surface 606 or a side edge surface 606 (like discussed below in FIGS. 7A-8).

The first surface 614 and the second surface 616 of the conventional head assembly 623 are perpendicular to each other and are coupled at common intersection or corner. Conversely, while the first surface 604 and the second surface 606 of the straight chamfered head assembly 621 are disposed perpendicular to one another, the first surface 604 is coupled to the second surface 606 through the chamfered surface 626, rather than being directly coupled to the second surface 606 at common intersection or corner. As such, the first surface 604 of the straight chamfered head assembly 621 terminates at a point that is recessed by a first distance 628 or width from the leading edge surface 606. The second surface 606 of the straight chamfered head assembly 621 terminates at a point that is recessed by a second distance 622 or depth from the MFS 604. The chamfered surface 626 may be a flat surface or a slightly curved, concave, rounded surface. Moreover, the intersection or corner of the first surface 604 and the chamfered surface 626, and the intersection or corner of the second surface 606 and the chamfered surface 626 are shown as points, the intersections or corners may be rounded.

In one embodiment, the first distance 628 is substantially greater than the second distance 622. The first distance 628 or width may be represented by "w", where "w" represents a difference in the width of the straight chamfered head assembly 621 and the conventional head assembly 623. The second distance 622 or depth may be represented by "d", where "d" represents a difference in depth the straight chamfered head assembly 621 and the conventional head assembly 623. The first distance 628 is between about 20 μm to about 100 μm, and the second distance 622 is between about 5 μm to about 25 μm. Thus, the ratio of depth to width of the chamfered surface 626 is between about 0.01 to about 0.2. For example, when "w" is about 0.5 mm and "d" is about 0.01 mm, as illustrated in the graph 625, the ratio of depth to width is about 0.01:0.5 or about 0.02. The listed dimensions and the listed ratios are not intended to be limiting, but to provide examples of possible embodiments.

Unlike the conventional head assembly 623, where the magnetic media 602*a* is in contact with only one edge of the conventional head assembly 603, the magnetic media 602*b* of the straight chamfered head assembly 621 may be in contact with the chamfered surface 626, a first edge, and a second edge, where the first edge is formed by the intersection of the first surface 604 and the chamfered surface 626 and the second edge is formed by the intersection of the second surface 606 and the chamfered surface 626. As such, the magnetic media 602*a* of the conventional head assembly 623 rises much higher over the first surface 614 than the magnetic media 602*b* rises over the first surface 604 of the straight chamfered head assembly 621. The magnetic media 602*b* rising lower over the first surface 604 of the straight chamfered head assembly 621 results in less deformation of the magnetic media 602*b*.

FIG. 6C illustrates a graph 650 comparing a cross-sectional view of a convex chamfered head assembly 631 to a cross-sectional view of a conventional head assembly 633, according to one embodiment. As shown in the graph 625, the footprint of the convex chamfered head assembly 631 is overlaid on top of that of the conventional head assembly 633. The convex chamfered head assembly 631 may be the head assembly 400 of FIGS. 4A-4B. The x-axis illustrates the tape width in millimeters, where each tick of the x-axis is incremented by 0.1 mm from the value of the previous tick. The y-axis illustrates the tape height deformation in millimeters, where each tick of the y-axis is incremented by 0.005 mm from the value of the previous tick.

The conventional head assembly 633 includes a first section 614*a* and a second section 614*b* of a first surface, where the first surface may be referred to as a first surface 614, and a first section 616*a* and a second section 616*b* of a second surface, where the second surface may be referred to as a second surface 616. The convex chamfered head assembly 631 comprises a first surface 604 disposed at the MFS, a second surface 606 disposed on the leading edge, and a chamfered surface 626 connecting the first surface 604 to the second surface 606. Furthermore, the first surface 604 may be referred to as a MFS 604 and the second surface 606 may be referred to as a leading edge surface 606 or a side edge surface 606 (like discussed below in FIGS. 7A-8).

The first surface 614 and the second surface 616 of the conventional head assembly 633 are perpendicular to each other and are coupled at common intersection or corner. Conversely, while the first surface 604 and the second surface 606 of the convex chamfered head assembly 631 are disposed perpendicular to one another, the first surface 604 is coupled to the second surface 606 through the chamfered surface 654, rather than being directly coupled to the second surface 606 at common intersection or corner. As such, the first surface 604 of the convex chamfered head assembly 631 terminates at a point that is recessed by a first distance 658 or width from the leading edge surface 606. The second surface 606 of the straight chamfered head assembly 621 terminates at a point that is recessed by a second distance 652 or depth from the MFS 604. The chamfered surface 654 may be a convex surface, a concave surface, or a curved or rounded surface. Moreover, the intersection or corner of the first surface 604 and the chamfered surface 654, and the intersection or corner of the second surface 606 and the chamfered surface 654 are shown as points, the intersections or corners may be rounded.

In one embodiment, the first distance 658 is substantially greater than the second distance 652. The first distance 658 may be represented by "w", where "w" represents a difference in the width of the convex chamfered head assembly 631 and the conventional head assembly 633. The second distance 652 may be represented by "d", where "d" represents a difference in depth of the convex chamfered head assembly 631 and the conventional head assembly 633. The first distance 658 is between about 20 μm to about 100 μm and the second distance 652 is between about 5 μm to about 25 μm. Thus, the ratio of depth to width of the chamfered surface 654 is between about 0.01 to about 0.2. For example, when "w" is about 0.5 mm and "d" is about 0.01 mm, as illustrated in the graph 650, the ratio of depth to width is about 0.01:0.5 or about 0.02. The listed dimensions and the listed ratios are not intended to be limiting, but to provide examples of possible embodiments.

Unlike the conventional head assembly 633, where the magnetic media 602a is in contact with only one edge of the conventional head assembly 633, the magnetic media 602b of the convex chamfered head assembly 631 may be in contact with one or more portions of the chamfered surface 654. As such, the magnetic media 602a of the conventional head assembly 633 rises much higher over the first surface 614 than the magnetic media 602b rises over the first surface 604 of the convex chamfered head assembly 631. The magnetic media 602b rising lower over the first surface 604 of the convex chamfered head assembly 631 results in less deformation of the magnetic media 602b.

It is to be understood that while the leading edge of the sensor guard of the chiplet(s) is described, the above embodiments of the stepped or chamfered sensor guard design may be applicable to any edge, surface, corner, or intersection of the plurality of sensor guards of the plurality of chiplets, such as the trailing edge or one or more corners. Furthermore, it is to be understood that any combination of the sensor guards comprising a chamfered to stepped surface may be utilized with any edge, surface, corner, or intersection of the each chiplet of the plurality of chiplets. For example, the leading edge of a chiplet may have a convex chamfered surface while the trailing edge of the chiplet has a stepped or straight chamfered surface.

As shown by the graphs 600, 625, 650 of FIGS. 6A-6C, with a stepped or a chamfered sensor guard design, the contact stress against the magnetic media may be reduced by about 68% as compared to the stress that the magnetic media may experience when a conventional or non-chamfered sensor guard design is utilized. Because the magnetic media may contact the chamfered sensor guard at two or more points, such as in a stepped sensor guard design, a straight chamfer sensor guard design, or a convex chamfer sensor guard design, the contact stress that the magnetic media may experience may be reduced, thus improving the functions of the head assembly and reducing deformation of the magnetic media. By modifying at least a leading edge of a sensor guard of the head assembly, the contact stress of the magnetic media may be decreased. In addition to decreasing the contact stress of the magnetic media, the reliability and lifespan of the magnetic media may be improved.

Figure 7A:
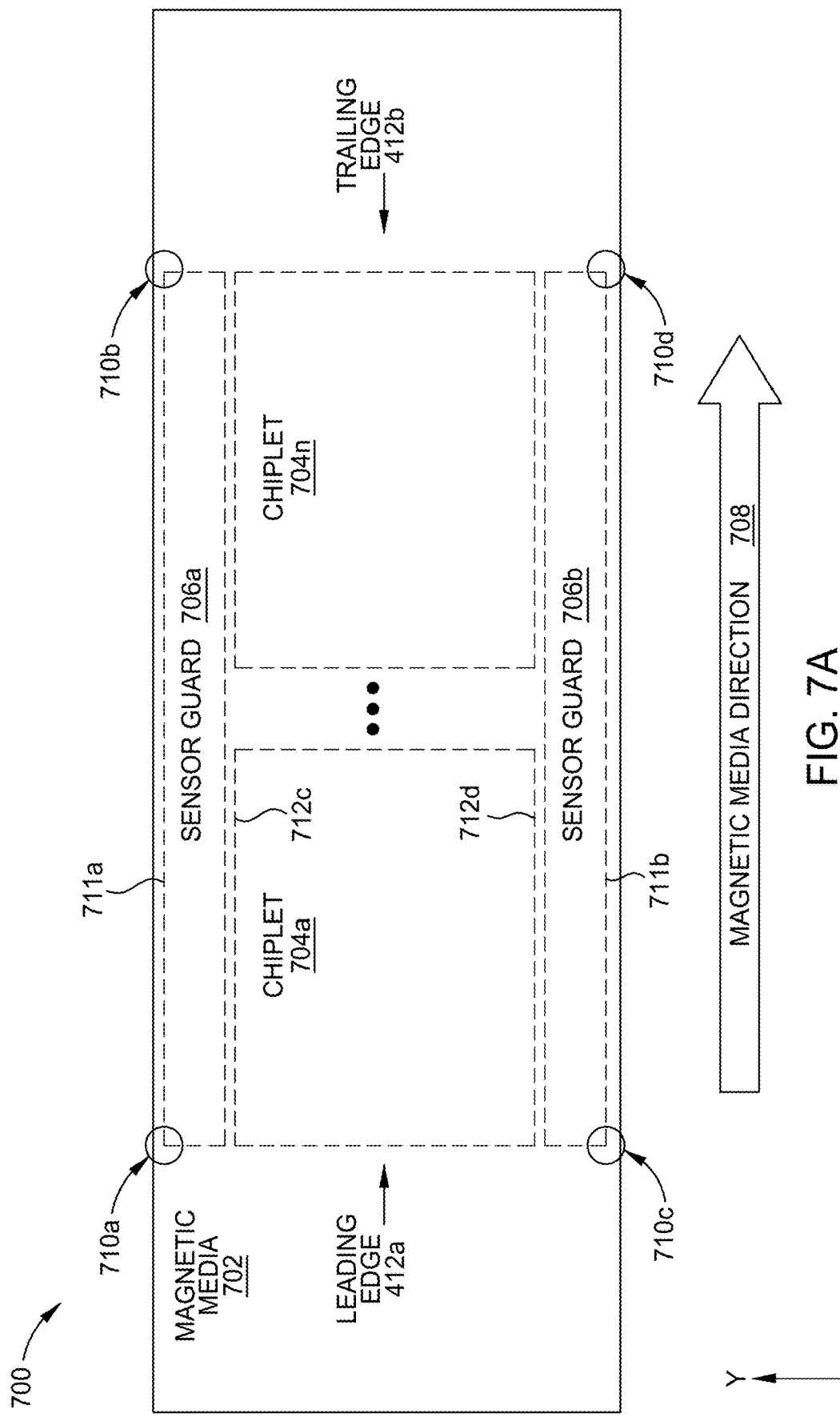
FIGS. 7A-7B illustrate a magnetic media with respect to a head assembly, accordance to another embodiment.
Figure 7B:
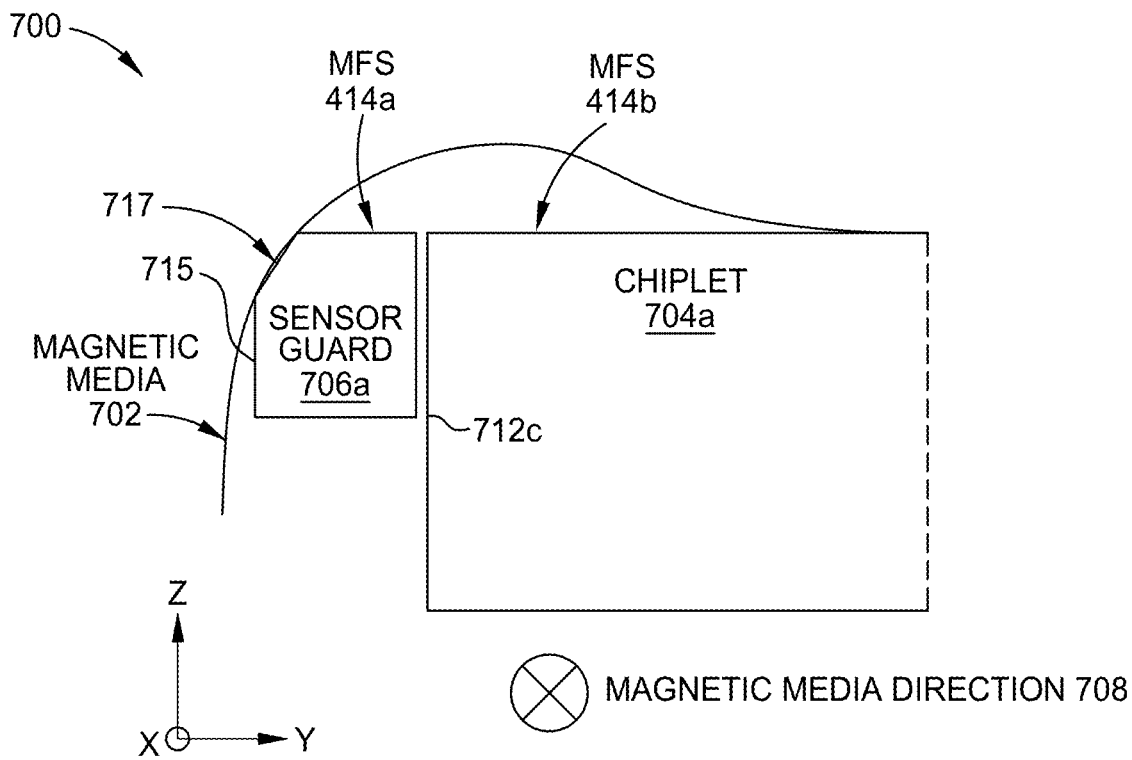

FIGS. 7A-7B illustrate a magnetic media 702 with respect to a head assembly 700, accordance to another embodiment. FIG. 7A is a top view of the magnetic media 702 with respect to the head assembly 700, according to one embodiment. FIG. 7B is a side view of the magnetic media 702 with respect the head assembly 700, according to one embodiment. The magnetic media 702 may be the tape media 115 of FIG. 1 or the magnetic media 402 of FIGS. 4A-4B. Furthermore, the head assembly 700 may be the head assembly 130 of FIG. 1. The head assembly 700 may optionally be used in combination with the head assembly 400 of FIGS. 4A-4B.

The head assembly 700 may further be used in combination with FIGS. 6A-6C above; however, the second surface 606 of FIGS. 6A-6C would instead be an outer surface 715 of the sensor guard 706a.

The head assembly 700 includes one or more chiplets 704a-704n, where the one or more chiplets 704a-704n may be mini-chiplets. Each of the one or more chiplets 704a-704n may be either a read chiplet or a write chiplet corresponding to one or more read heads (not shown) or one or more write heads (not shown) of the head assembly 700. The head assembly 700 may comprise one or more rows of one or more chiplets 704a-704n, such that an additional row(s) may be disposed adjacent to the row of one or more chiplets 704a-704n in the y-direction.

The head assembly 700 further comprises one or more sensor guards 706a-706n (two shown) disposed adjacent to at least one chiplet. The one or more sensor guards 706a-706n, which may be referred to herein as "sensor guard(s) 706, are disposed on side edges or surfaces 712c, 712d of the head assembly 700, extending between the leading edge 412a and the trailing edge 412b. In one embodiment, each row of chiplets comprises a sensor guard 706. In another embodiment, each chiplet 704a-704n comprises a sensor guard 706. In yet another embodiment, each of the chiplets 704a-704n comprises two sensor guards 706, where one sensor guard 706 is disposed adjacent to both sides 712c, 712d of each chiplet. The plurality of sensor guards 706a-706n may protect the head assembly 700 from wear resulting from the friction from the magnetic media 702 as the magnetic media 702 moves across the head assembly 700 in the magnetic media direction 708 in the x-direction.

The magnetic media 702 moves in the positive x-direction as indicated by the arrow representing the magnetic media direction 708. It is to be understood that the vector (x,y,z) representation of the movement of the magnetic media 702 is not limiting and is an example of a possible direction of the movement of the magnetic media 702. As noted above, the leading edge 412a and the trailing edge 412b of the head assembly is determined by the magnetic media direction 708.

When the magnetic media 702 moves in the magnetic media direction 708 during the operation of the data storage device, such as the TED 100 of FIG. 1, one or more points or corners 710a-710d or one or more sections or edges 711a, 711b of the head assembly 700 may cause the magnetic media 702 to experience more stress than other areas of the magnetic media 702, as the magnetic media 702 has a greater width in the y-direction than the one or more sensor guards 706a-706n and the one or more chiplets 704a-704n. The additional stress caused by the one or more points 710a-710d or one or more sections or edges 711a, 711b may result in increased wear of the magnetic media 702, such that the magnetic media 702 may no longer be reliable. However, by altering the sensor guard 706 at the one or more points 710a-710d, such as in a stepped sensor guard design like shown in FIG. 6A, a straight chamfer sensor guard design like shown in FIG. 6B, or a convex chamfer sensor guard design like shown in FIG. 6C, the contact stress that the magnetic media 702 may experience may be reduced while protecting the sides of the chiplet(s) 704a-704n. It is to be understood that more than or less than the described number of greater stress locations may exist on the magnetic media 702 as the magnetic media 702 moves across the head assembly 700.

In FIG. 7B, a sensor guard 706a is disposed at a side edge 712c of the head assembly 700. While not shown, the sensor guard 706b disposed on the opposite side edge 712d of the head assembly 700 would look similar, such as a mirror image of the sensor guard 706a shown. As such, while only the sensor guard 706a is shown and described, the same details apply to any other sensor guards 706b-706n. The first chiplet 704a is disposed adjacent to the sensor guard 706a, where a first MFS 714a of the sensor guard 706a and the second MFS 714b of the chiplet 704a are in line with each other (i.e., form one continuous MFS). One or more chiplets (not shown) may be disposed behind the first chiplet 704a in a row in the x-direction.

As shown, an outer edge 717 of the sensor guard 706a disposed between the side edge 715 and the MFS 414a is chamfered or beveled (sometimes referred to as chamfered surface 717 or chamfered edge 717). The chamfered edge 717 may extend the entire length or edge 711a of the sensor guard 706a in the x-direction. Thus, rather than the outer edge 717 protruding out at a right angle, the outer edge 717 is angled, stepped, or rounded. The chamfered edge 717 may be curved, convex, stepped, or straight, as discussed above in FIGS. 6A-6C.

The chamfered edge 717 has a ratio of depth in the z-direction to width in the y-direction between about 0.01 and about 0.2. The ratio of depth to width describes the depth to width ratio of the outer edge 717 of the sensor guard 706a. In some embodiments, the ratio of depth to width describes the depth to width ratio of the corners, such as any location 710a-710d, of the plurality of sensor guards 706a-706n. Because of the chamfered edge 717 of the sensor guard 706a, the stress that magnetic media 702 may experience may be less than the stress that the magnetic media 702 may experience without a chamfered edge (i.e., when the side edge surface protrudes out at a right angle). Furthermore, the side surface 712c of the chiplet 704a are protected by the sensor guard 706a, preventing the chiplet 704a from wear. It is noted that although a tape embedded drive from FIG. 1 is referenced as an example, the magnetic media 702 does not need to be embedded within the storage device, and may be from an insertable cartridge or cassette such as that conventionally used in an LTO tape drive.

The sensor guard(s) 706 and the chiplets are fabricated separately. Upon being fabricated, the sensor guard 706 is then coupled to the chiplet. By fabricating the sensor guards 706 and chiplets separately, the chiplets are better protected, as the chiplets themselves are not etched to create the chamfered edge 717.

Figure 8:
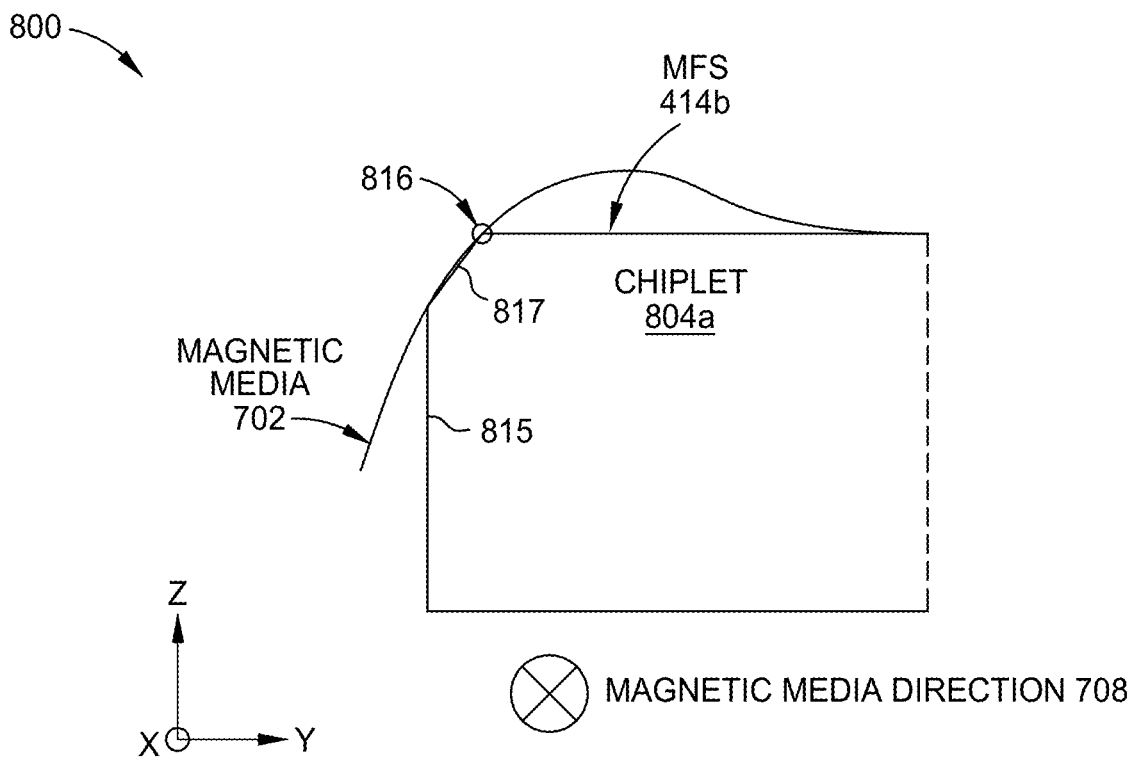
FIG. 8 is a side view of the magnetic media with respect a head assembly, according to yet another embodiment.

FIG. 8 is a side view of the magnetic media 702 with respect a head assembly 800, according to yet another embodiment. The magnetic media 702 may be the tape media 115 of FIG. 1 or the magnetic media 402 of FIGS. 4A-4B. Furthermore, the head assembly 800 may be the head assembly 130 of FIG. 1. The head assembly 800 may optionally be used in combination with the head assembly 400 of FIGS. 4A-4B. The head assembly 800 may further be used in combination with FIGS. 6A-6C above; however, the second surface 606 of FIGS. 6A-6C would instead be an outer surface 815 of the chiplet 804.

The head assembly 800 is similar to the head assembly 700 of FIGS. 7A-7B; however, the head assembly 800 does not comprise sensor guards. Rather, the side surfaces 817 (e.g., the surfaces disposed between the leading edge and the trailing edge) of one or more chiplets 804a are chamfered, beveled, or stepped, like described above in FIGS. 6A-6C.

The head assembly 800 includes one or more chiplets 804a (one shown), where the one or more chiplets 804a may be mini-chiplets. Each of the one or more chiplets 804a may be either a read chiplet or a write chiplet corresponding to one or more read heads (not shown) or one or more write heads (not shown) of the head assembly 800. The head assembly 800 may comprise one or more rows of one or more chiplets 804a, such that an additional row(s) may be disposed adjacent to the row of one or more chiplets 804a in the y-direction.

As noted above, each chiplet 804a comprises one or more chamfered, beveled, or stepped side surfaces 817 disposed between the side surface 815 and the MFS 414b. The one or more chamfered, beveled, or stepped side surfaces 817 of the chiplets 804a extend between the leading edge 412a and the trailing edge 412b. The one or more chamfered, beveled, or stepped side surfaces 817 may extend an entire length of the chiplet(s) 804a in the x-direction.

In one embodiment, each row of chiplets 804a comprises chamfered, beveled, or stepped side surface 817. In another embodiment, each chiplet 804a comprises a chamfered, beveled, or stepped side surface 817. In yet another embodiment, each of the chiplets 804a comprises two chamfered, beveled, or stepped side surfaces 817, where one chamfered, beveled, or stepped side surface 817 is disposed adjacent to both sides of each chiplet 804a. The chamfered, beveled, or stepped side surfaces 817 may protect the head assembly 800 from wear resulting from the friction from the magnetic media 702 as the magnetic media 702 moves across the head assembly 800 in the magnetic media direction 708 in the x-direction.

The magnetic media 702 moves in the positive x-direction as indicated by the arrow representing the magnetic media direction 708. It is to be understood that the vector (x,y,z) representation of the movement of the magnetic media 702 is not limiting and is an example of a possible direction of the movement of the magnetic media 702. As noted above, the leading edge 412a and the trailing edge 412b of the head assembly is determined by the magnetic media direction 708.

By altering the chiplet(s) 804a at the one or more points, such as in a stepped sensor guard design like shown in FIG. 6A, a straight chamfer sensor guard design like shown in FIG. 6B, or a convex chamfer sensor guard design like shown in FIG. 6C, the contact stress that the magnetic media 702 may experience may be reduced while protecting the sides of the chiplet(s) 804a. Thus, rather than the chamfered, beveled, or stepped side surface 817 protruding out at a right angle, the chamfered, beveled, or stepped side surface 817 is angled, stepped, or rounded.

The chamfered, beveled, or stepped side surface 817 has a ratio of depth in the z-direction to width in the y-direction between about 0.01 and about 0.2. The ratio of depth to width describes the depth to width ratio of the chamfered, beveled, or stepped side surface 817 of the chiplet 804a. In some embodiments, the ratio of depth to width describes the depth to width ratio of the corners of the plurality of chiplets 804a. Because of the chamfered, beveled, or stepped side surfaces 817 of the chiplet 804a, the stress that magnetic media 702 may experience may be less than the stress that the magnetic media 702 may experience without a chamfered edge (i.e., when the side edge surface protrudes out at a right angle).

Thus, by including a chamfered, beveled, or stepped side surface (e.g., a surface disposed between a leading edge and a trailing edge) on a sensor guard or a chiplet, the side edges of the chiplet will be better protected and the magnetic media will experience less stress, prolonging the overall life of the head assembly.

In one embodiment, a magnetic recording head assembly, configured to read from and writ to a magnetic media, comprises one or more rows of chiplets one or more rows of chiplets, each of the one or more rows of chiplets having a leading edge, a trailing edge, a first side edge, and a second side edge, the first and second side edges being disposed between the leading edge and the trailing edge, and one or more sensor guards disposed adjacent to at least one of the first side edge and the second side edge of each of the one or more rows of chiplets, wherein each of the one or more sensor guards comprises a first surface disposed at a first MFS, a second surface disposed perpendicular to the first surface, and a chamfered surface coupling the first surface to the second surface.

The chamfered surface is a flat surface. The chamfered surface is a convex surface. The magnetic media is in contact with at least a portion of the chamfered surface. A first sensor guard is disposed adjacent to the first side edge and a second sensor guard is disposed adjacent to the second side edge. The chamfered surface of each of the one or more sensor guards has a first ratio of depth to width between about 0.01 and about 0.2. The chamfered surface of each of the one or more sensor guards has a length substantially equal to a length of the first side edge or the second side edge. Each row of chiplets has a second MFS, the first MFS of each of the one or more sensor guards and the second MFS of each row of chiplets forms one continuous MFS.

In another embodiment, a data storage device includes a magnetic recording head assembly configured to read from and write to a magnetic media. The magnetic recording head assembly comprises one or more rows of chiplets one or more rows of chiplets, each of the one or more rows of chiplets having a leading edge, a trailing edge, a first side edge, and a second side edge, the first and second side edges being disposed between the leading edge and the trailing edge, and one or more sensor guards disposed adjacent to at least one of the first side edge and the second side edge of each of the one or more of rows of chiplets, wherein each of the one or more sensor guards comprises a first surface disposed at a MFS, a second surface disposed perpendicular to the first surface, a third surface disposed perpendicular to the first surface and parallel to the second surface, where the third surface is coupled to the first surface, and a fourth surface disposed perpendicular to the second surface and parallel to the first surface, where the fourth surface is coupled to the second surface and the third surface.

A first sensor guard is disposed adjacent to the first side edge and a second sensor guard is disposed adjacent to the second side edge. The first surface and the third surface are recessed a first distance from the leading edge. The second surface and the fourth surface are recessed a second distance from the MFS. The first distance is substantially greater than the second distance. The first distance is between about 20 µm and about 100 µm and the second distance is between about 5 µm and about 25 µm. The magnetic media is in contact with at least one of a first edge and a second edge, where the first edge is formed by the intersection of the first surface and the third surface and the second edge is formed by the intersection of the second surface and the fourth surface.

In another embodiment, a magnetic recording head assembly configured to read from and write to a magnetic media comprising one or more rows of chiplets, each of the one or more rows of chiplets having a leading edge, a trailing edge, a first side edge, a second side edge, and a media facing surface (MFS), wherein: the first and second side edges are disposed between the leading edge and the trailing edge, and the first side edge comprises a first chamfered surface disposed adjacent to the MFS and a first outer side surface of each of the one or more rows of chiplets, the first outer side surface being disposed perpendicular to the MFS.

The first chamfered surface comprises a flat surface or a convex surface. The first chamfered surface has a ratio of depth to width between about 0.01 and about 0.2. The second side edge comprises a second chamfered surface disposed adjacent to the MFS and a second outer side surface of each of the one or more rows of chiplets, the second outer side surface being disposed perpendicular to the MFS.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
  a magnetic recording head assembly, configured to read from and write to a magnetic media, comprising:
    one or more rows of chiplets, each of the one or more rows of chiplets having a leading edge, a trailing edge, a first side edge, and a second side edge, the first and second side edges being disposed between the leading edge and the trailing edge; and
    one or more sensor guards disposed adjacent to at least one of the first side edge and the second side edge of each of the one or more of rows of chiplets, wherein each of the one or more sensor guards comprises:
      a first surface disposed at a media facing surface (MFS);
      a second surface disposed perpendicular to the first surface;
      a third surface disposed perpendicular to the first surface and parallel to the second surface, wherein the third surface is coupled to the first surface; and
      a fourth surface disposed perpendicular to the second surface and parallel to the first surface, wherein the fourth surface is coupled to the second surface and the third surface, and wherein the first, second, third, and fourth surfaces form a continuous step-like shape.

2. The data storage device of claim 1, wherein a first sensor guard is disposed adjacent to the first side edge and a second sensor guard is disposed adjacent to the second side edge.

3. The data storage device of claim 1, wherein the third surface is recessed a first distance from the leading edge.

4. The data storage device of claim 3, wherein the second surface and the fourth surface are recessed a second distance from the MFS.

5. The data storage device of claim 4, wherein the first distance is greater than the second distance.

6. The data storage device of claim 5, wherein the first distance is between about 20 µm and about 100 µm and the second distance is between about 5 µm and about 25 µm.

7. The data storage device of claim 1, wherein the magnetic media is in contact with at least one of a first edge and a second edge, wherein the first edge is formed by the intersection of the first surface and the third surface and the second edge is formed by the intersection of the second surface and the fourth surface.

8. The data storage device of claim 1, wherein a ratio of a depth of the third surface to a width of the fourth surface is between about 0.01 to about 0.2.

9. A magnetic recording head assembly, configured to read from and write to a magnetic media, comprising:
one or more rows of chiplets, each of the one or more rows of chiplets having a leading edge, a trailing edge, a first side edge, and a second side edge, the first and second side edges being disposed between the leading edge and the trailing edge; and
one or more sensor guards disposed adjacent to at least one of the first side edge and the second side edge of each of the one or more of rows of chiplets, wherein each of the one or more sensor guards comprises:
a first surface disposed at a first media facing surface (MFS);
a second surface disposed perpendicular to the first surface;
a third surface disposed perpendicular to the first surface and parallel to the second surface, wherein the third surface is coupled to the first surface, the third surface having a depth of about 5 µm to about 25 µm; and
a fourth surface disposed parallel to the first surface, wherein the fourth surface is coupled to the second surface and the third surface, the fourth surface having a width of about 20 µm to about 100 µm.

10. The magnetic recording head assembly of claim 9, wherein a first sensor guard is disposed adjacent to the first side edge and a second sensor guard is disposed adjacent to the second side edge.

11. The magnetic recording head assembly of claim 9, wherein a ratio of a depth of the third surface to a width of the fourth surface is between about 0.05 to about 0.2.

12. The magnetic recording head assembly of claim 9, wherein the magnetic media is in contact with at least one of a first edge and a second edge, wherein the first edge is formed by the intersection of the first surface and the third surface and the second edge is formed by the intersection of the second surface and the fourth surface.

13. The magnetic recording head assembly of claim 9, wherein each row of chiplets has a second MFS, the first MFS of each of the one or more sensor guards and the second MFS of each row of chiplets forms one continuous MFS.

14. A magnetic recording device comprising the magnetic recording head assembly of claim 9.

15. A data storage device, comprising:
a magnetic recording head assembly, configured to read from and write to a magnetic media, comprising:
one or more rows of chiplets, each of the one or more rows of chiplets having a leading edge, a trailing edge, a first side edge, and a second side edge, the first and second side edges being disposed between the leading edge and the trailing edge; and
one or more sensor guards disposed adjacent to at least one of the first side edge and the second side edge of each of the one or more of rows of chiplets, wherein each of the one or more sensor guards comprises:
a first surface disposed at a media facing surface (MFS);
a second surface disposed perpendicular to the first surface;
a third surface disposed perpendicular to the first surface and parallel to the second surface, wherein the third surface is coupled to the first surface; and
a fourth surface disposed perpendicular to the second surface and parallel to the first surface, wherein the fourth surface is coupled to the second surface and the third surface, wherein a ratio of a depth of the third surface to a width of the fourth surface is between about 0.01 to about 0.2.

16. The data storage device of claim 15, wherein a first sensor guard is disposed adjacent to the first side edge and a second sensor guard is disposed adjacent to the second side edge.

17. The data storage device of claim 15, wherein the magnetic media is in contact with at least one of a first edge and a second edge, wherein the first edge is formed by the intersection of the first surface and the third surface and the second edge is formed by the intersection of the second surface and the fourth surface.

18. The data storage device of claim 15, wherein the third surface is recessed a first distance from the leading edge, wherein the second surface and the fourth surface are recessed a second distance from the MFS.

19. The data storage device of claim 18, wherein the first distance is greater than the second distance.

20. The data storage device of claim 19, wherein the first distance is between about 20 µm and about 100 µm and the second distance is between about 5 µm and about 25 µm.

* * * * *